Dec. 22, 1970   M. SEEDMAN   3,548,423
PERSONAL WASHBOWL
Filed Feb. 6, 1969

INVENTOR
MYER SEEDMAN
BY *Abraham A. Saffitz*
ATTORNEY

United States Patent Office 3,548,423
Patented Dec. 22, 1970

3,548,423
PERSONAL WASHBOWL
Myer Seedman, 7 Stainbeck Walk,
Leeds 7, Yorkshire, England
Filed Feb. 6, 1969, Ser. No. 797,193
Claims priority, application Great Britain, Feb. 14, 1968,
7,237/68
Int. Cl. A47k 1/04; E03c 1/18
U.S. Cl. 4—187                                              4 Claims

ABSTRACT OF THE DISCLOSURE

A personal washbowl formed at two opposite sides thereof with two recesses which are directed towards one another and which extend substantially vertically throughout at least the depth of the boundary wall of the bowl, said recesses being shaped to accommodate the legs of the user so that, when the bowl is placed between the legs of the user above or below the knees, the bowl can easily be held in place by inward pressure of the legs engaged within the recesses.

---

This invention relates to a personal washbowl and has for its object to provide such a bowl specifically shaped and constructed to facilitate the washing of the lower part of a person's body without the need for the person to undress and use a bath, and when there is no other provision such as a bidet available.

According to the invention there is provided a bowl formed at two opposite sides thereof with two recesses which are directed towards one another, each such recess being so shaped that, when the bowl is placed between the legs of the user above or below the knees, the bowl can easily be held in place by inward pressure of the legs engaged within the recesses.

The recesses may be curved, for example substantially semi-circular, and may be narrower across their entrances to give a "clip" fit on the user's legs, or the width of their entrances may increase outwardly to enable the recesses to accommodate a wide range of leg thicknesses. For this latter purpose the recesses might even be formed to V-shape instead of being curved.

The bowl may be circular, elliptical or other suitable shape in plan and preferably has a flattened base to enable it to stand level on the floor or other flat surface.

In order that the invention may be fully and clearly comprehended, the same will now be described with reference to the accompanying drawings, in which.

Figure 1:
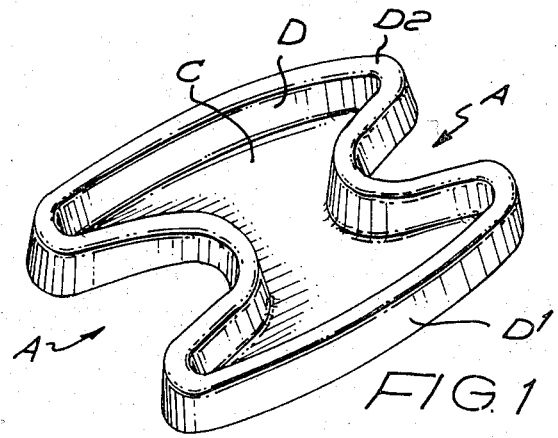
FIG. 1 is an upper perspective view of one form of bowl according to the invention.
Figure 2:
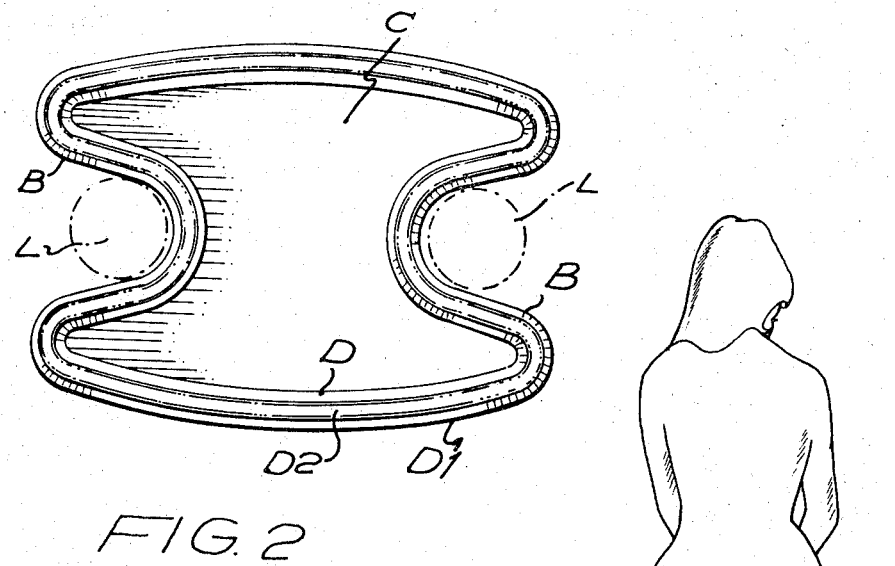
FIG. 2 is a plan of this bowl.

As shown in these drawings, the bowl may be described as mainly elliptical in plan but with the ends which lie on the major axis curved inwardly symmetrically about said axis to produce two recesses A. These curved portions join the main part of the bowl along outwardly divergent portions B and are of such a size as to accommodate the user's legs indicated at L in FIG. 2. The bowl has a flat base C and a continuous upstanding wall D, the outer part D1 of the wall joining the top part D2 along a rounded edge to give comfort against the user's legs and the lower edge of the part D1 being also rounded or smoothed off.

In the illustrated form of bowl the inner and outer parts of the wall D are not quite vertical but are slightly divergent downwards. This facilitates production by a moulding process and also enables a number of bowls to be "nested" for reducing the storage space needed.

Figure 3:
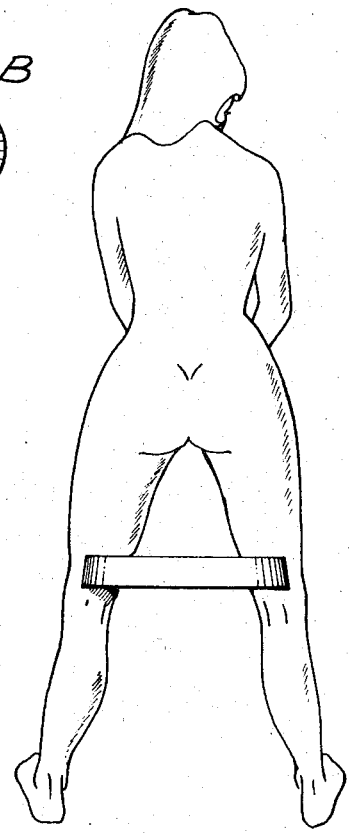
FIG. 3 illustrates this bowl in use.

A bowl according to the invention can easily be gripped between the user's legs just above the knees (see FIG. 3) or just below, with the legs fitting comfortably in the recesses A, so that the bowl can easily be held in place by inward pressure of the legs only, leaving the user's hands free. The outwardly increasing width of the recesses at B will enable the bowl to fit to and be gripped comfortably by most thickness of legs, and as an alternative the recesses could be V-shaped.

The lower part of the body can then be washed with liberal application of water because substantially all the water will drain or drop into the bowl. In fact water may be placed in the bowl to facilitate the washing.

The bowl will preferably be made from a synthetic plastics material, although it could be made from pressed aluminium or other metal, and it could be produced quite cheaply.

Such a bowl may be very useful for travellers in conditions where it is not possible or convenient to use a bath and being light and fairly small it could be transported as part of a person's luggage.

If desired a soap compartment may be provided on the inside or outside of the bowl.

I claim:

1. A personal washbowl formed at two opposite sides thereof with two recesses which are directed towards one another and which extend substantially vertically throughout at least the depth of the boundary wall of the bowl, said recesses being shaped to accommodate the legs of the user so that, when the bowl is placed between the legs of the user above or below the knees, the bowl can easily be held in place by inward pressure of the legs engaged within the recesses.

2. A bowl as claimed in claim 1, wherein the width of each of said recesses increases outwardly to enable them to accommodate a wide range of leg thicknesses and still ensure a good grip.

3. A bowl as claimed in claim 1 comprising a flat base with a continuous upstanding wall, the upper outer part of the wall which defines the recesses having a rounded or smoothed edge.

4. A bowl as claimed in claim 1, and which is mainly elliptical in plan and has the said recesses located at the ends lying on the major axis.

References Cited

UNITED STATES PATENTS

| 149,520 | 4/1874 | Potter | 4—167 |
| 881,543 | 3/1908 | Cole | 4—167 |
| 1,834,144 | 12/1931 | Coderra | 4—167UX |
| 2,989,756 | 6/1961 | Gaston | 4—168 |
| 3,251,637 | 5/1966 | Parsons, Jr. | 4—168X |
| 3,453,665 | 7/1969 | Cokic et al. | 4—187X |

FOREIGN PATENTS

| 943,042 | 11/1963 | Great Britain | 4—167 |

LAVERNE D. GEIGER, Primary Examiner

H. K. ARTIS, Assistant Examiner

U.S. Cl. X.R.

4—1, 167